US011476917B2

United States Patent
Tidestav et al.

(10) Patent No.: US 11,476,917 B2
(45) Date of Patent: Oct. 18, 2022

(54) BEAM SELECTION PRIORITY

(71) Applicant: Telefonaktiebolaget LM Ericsson (publ), Stockholm (SE)

(72) Inventors: Claes Tidestav, Bålsta (SE); Mattias Frenne, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 643 days.

(21) Appl. No.: 16/329,009

(22) PCT Filed: Jan. 21, 2019

(86) PCT No.: PCT/EP2019/051343
§ 371 (c)(1),
(2) Date: Feb. 27, 2019

(87) PCT Pub. No.: WO2019/141839
PCT Pub. Date: Jul. 25, 2019

(65) Prior Publication Data
US 2021/0359746 A1    Nov. 18, 2021

Related U.S. Application Data

(60) Provisional application No. 62/620,155, filed on Jan. 22, 2018.

(51) Int. Cl.
*H04B 7/08* (2006.01)
*H04W 16/28* (2009.01)

(52) U.S. Cl.
CPC ............ *H04B 7/088* (2013.01); *H04W 16/28* (2013.01)

(58) Field of Classification Search
CPC .............................. H04B 7/088; H04W 16/28
See application file for complete search history.

(56) References Cited

U.S. PATENT DOCUMENTS

2013/0155847 A1*  6/2013  Li ..................... H04W 76/10
                                                                   370/225
2019/0069285 A1*  2/2019  Chandrasekhar .... H04B 7/0695
(Continued)

FOREIGN PATENT DOCUMENTS

EP          3122136 A1    1/2017
KR      20150097939 A    8/2015

OTHER PUBLICATIONS

3GPP TS 38.214 V15.0.0; 3rd Generation Partnership Project; Technical Specification Group Radio Access Network; NR; Physical layer procedures for data (Release 15); Dec. 2017, consisting of 71-pages.

(Continued)

*Primary Examiner* — Jaison Joseph
(74) *Attorney, Agent, or Firm* — Christopher & Weisberg, P.A.

(57) ABSTRACT

A method, system, network node and wireless device for beam selection priority in a wireless communication system are disclosed. According to one aspect of the disclosure, a wireless device is provided. The wireless device is provided with different beam indications for reception of at least a first signal and a second signal. The wireless device includes processing circuitry configured to receive the first signal of a first signal type on a beam indicated by one of the beam indications, the first signal type having a higher priority than a second signal type of the second signal.

28 Claims, 12 Drawing Sheets

(56) References Cited

U.S. PATENT DOCUMENTS

| | | | | |
|---|---|---|---|---|
| 2019/0181932 | A1* | 6/2019 | Jayawardene | H04B 7/0617 |
| 2020/0067674 | A1* | 2/2020 | Guan | H04L 5/00 |
| 2020/0099491 | A1* | 3/2020 | Qin | H04L 5/0048 |
| 2020/0178172 | A1* | 6/2020 | Thangarasa | H04W 52/02 |
| 2020/0366339 | A1* | 11/2020 | Gao | H04B 7/088 |

OTHER PUBLICATIONS

International Search Report and Written Opinion dated Mar. 14, 2019 for International Application No. PCT/EP2019/051343 filed on Jan. 21, 2019, consisting of 16-pages.

Korean Office Action with English Summary translation dated Jun. 28, 2021 for Korean Patent Application No. 20207022470, consisting of 8-pages.

International Search Report and Written Opinion dated Mar. 14, 2019 for International Application No. PCT/EP2019/051343 filed Jan. 21, 2019, consisting of 13-pages.

3GPP TSG RAN WG1 Meeting #87 R1-1611388; Title: QCL between CSI-RS for beam management; Agenda Item: 7.1.3.3; Source: CATT; Document for: Discussion and Decision; Date and Location: Nov. 14-18, 2016, Reno, USA, consisting of 3-pages.

Japanese Office Action with English Summary Translation dated Oct. 29, 2021 for Japanese Patent Application No. 2020-540406, consisting of 5-pages.

3GPP TSG RAN WG1 NR Ad-Hoc#2 R1-1710183; Title: Discussion on DL beam management; Agenda Item: 5.1.2.2.1; Source: ZTE; Document for: Discussion and Decision; Date and Location: Jun. 27-30, 2017, Qingdao, P.R. China, consisting of 15-pages.

Korean Notice of Allowance with English Machine Translation dated Aug. 25, 2022 for Korean Patent Application No. 2020-7022470, consisting of 12-pages.

* cited by examiner

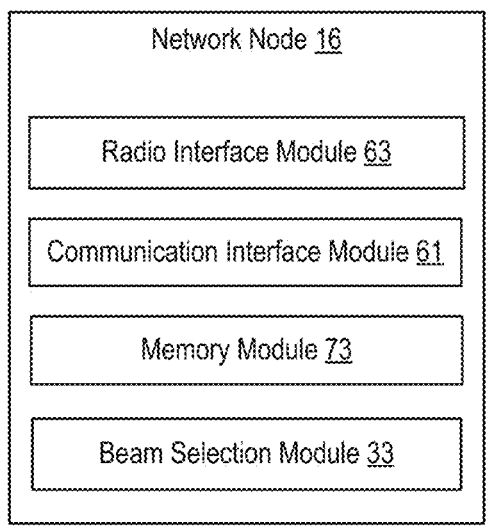
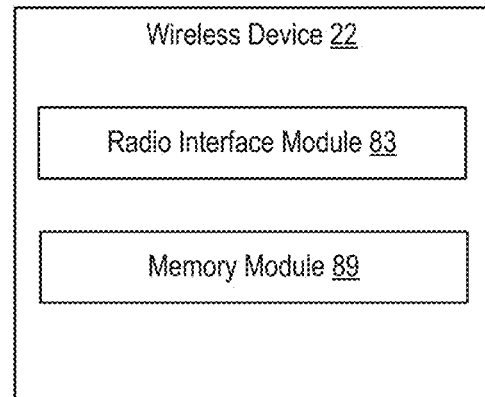
FIG. 6
FIG. 5
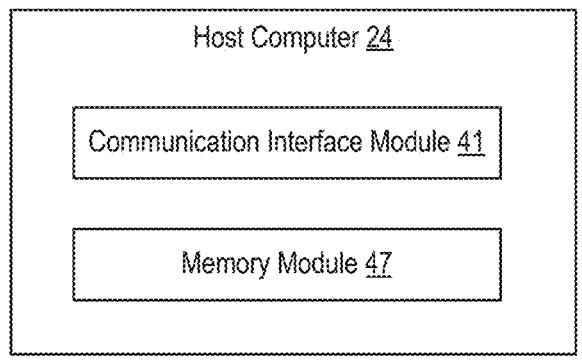
FIG. 4

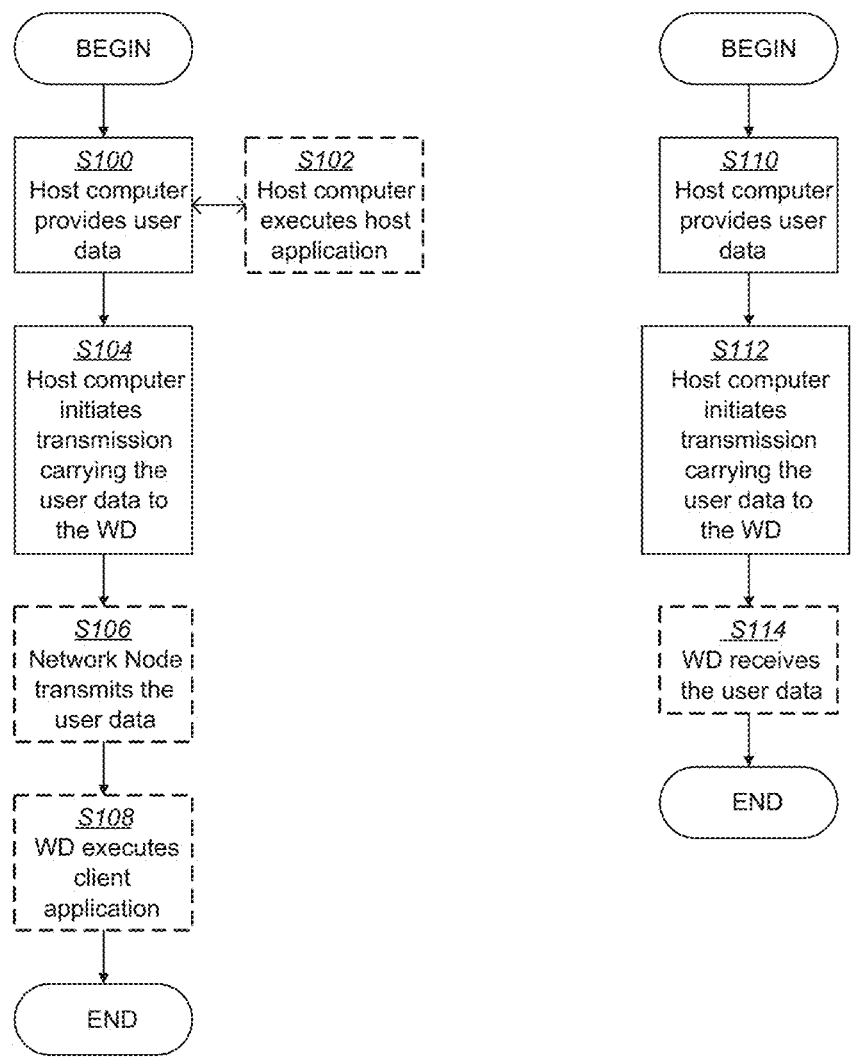

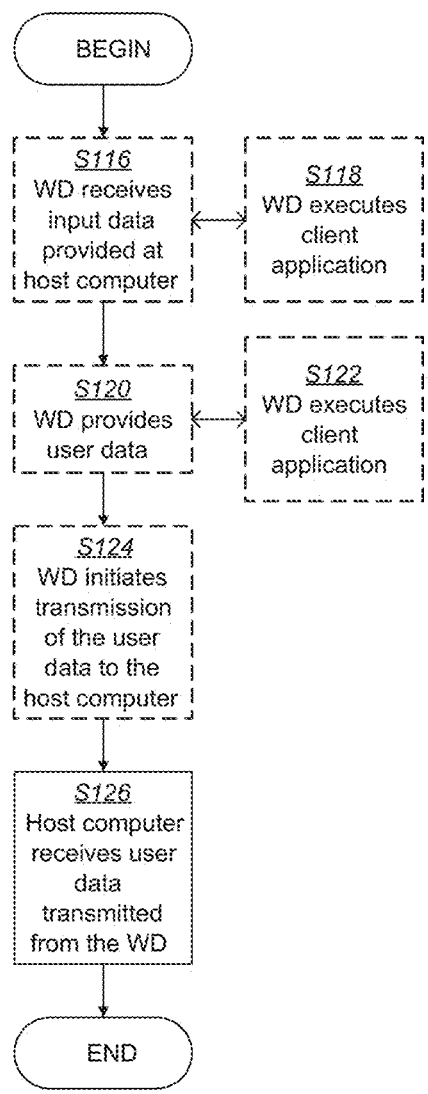
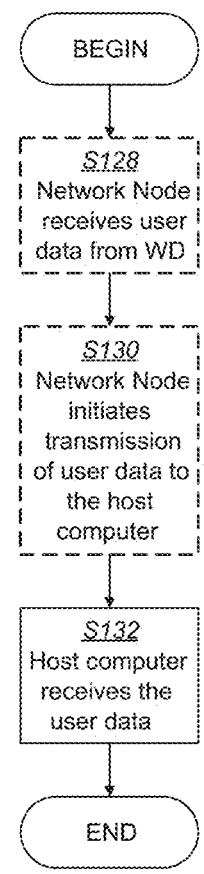
FIG. 9
FIG. 10

BEAM SELECTION PRIORITY

CROSS-REFERENCE TO RELATED APPLICATIONS

This application is a Submission Under 35 U.S.C. § 371 for U.S. National Stage Patent Application of International Application No.: PCT/EP2019/051343, filed Jan. 21, 2019 entitled "BEAM SELECTION PRIORITY," which claims priority to U.S. Provisional Application No. 62/620,155, filed Jan. 22, 2018, entitled "BEAM SELECTION PRIORITY," the entireties of both of which are incorporated herein by reference.

TECHNICAL FIELD

The present disclosure relates to wireless communications, and in particular, to beam selection priority in a wireless communication system.

BACKGROUND

In a wireless communication system, wireless devices (WDs) operating at high carrier frequencies typically utilize panel antennas, which have a high directivity. A WD may be equipped with several such panels, where each panel can receive from a limited set of directions. In contrast, WD antennas for lower carrier frequencies are typically omni-directional, meaning that one antenna can receive transmissions from all directions. One such antenna panel may also receive from a number of directions in specific beams.

Beamforming at the base station is becoming increasingly common in modern communications, motivated by high carrier frequencies. Since the antenna element size is proportional to the carrier wavelength, the antennas become smaller as carrier frequencies become higher, which makes deployment of antenna arrays with many antenna elements possible. Such large antenna arrays enable the base station to generate narrow and highly directional beams.

In a scenario with highly directional antennas at the base station, and antenna panels at the WD, the situation in FIG. 1 may occur. FIG. 1 shows two directional beams 1 and 2 transmitted by a base station 3. In this example, the WD 4 can only reliably receive the signal if the WD 4 chooses the correct Rx beam. Therefore, the base station 3 cannot safely change transmit beams without informing the WD 4.

To solve this problem, beam indications have been introduced by the Third Generation Partnership Project (3GPP) for New Radio (NR). The beam indications are transmitted from the base station to the WD, and at a certain point in time, the base station and WD update their beams, e.g., from beam 1 to beam 2.

In 3GPP, the beam indications are defined as spatial quasi co-location (QCL) relations. A beam indication tells the WD that it may receive the signal in the new beam in the same way it received a previous reference signal. The WD may assume that the signal in the new beam has the same QCL properties as the previous reference signal. In what follows, we will use the term beam indication to describe these QCL relations.

Moreover, the WD may receive different beam indications for different signals. For example, the WD may be provided with one beam indication to receive the physical downlink shared channel (PDSCH) and another beam indication for a channel state information reference signal (CSI-RS).

Currently, the base station may transmit two or more signals to the WD at the same time. These two signals may come from different directions, and the base station may provide different beam indications to the WD for the reception of the two or more signals. The WD may be unable to follow both beam indications, due to limitations in its hardware. This would result in one or all of the signals not being received with sufficient quality.

Therefore, there may be a need for providing measures which may ensure that the base station may flexibly transmit one or more signals to the WD which in turn may receive the one or more signals with sufficient signal quality in a reliable and easy way.

SUMMARY

Some embodiments advantageously provide methods, systems, and apparatuses for beam selection priority in a wireless communication system.

If a WD is provided with several conflicting beam indications for receiving two or more channels, the WD should apply the beam indications based on the priority of the channels. As an example, the base station may prioritize the reception of the PDSCH over the measurement of the CSI-RS. If the WD is provided with beam indications for PDSCH and CSI-RS and cannot follow both indications at the same time, the WD may use the beam indication for PDSCH, following the recommendation of the network node.

Beam indications for the uplink can be provided as well, where the WD is provided with the beam where it should transmit uplink signals, e.g., physical uplink shared channel (PUSCH) or sounding reference signal (SRS). If these beam indications are conflicting, then the WD would apply the beam indication for the signal with the highest priority first.

Some embodiments enable the network to ensure that the most important signals can be received without introducing explicit signaling restrictions which would negatively impact the scheduling flexibility of the network. Further, since the WD may apply the beam indications according to the priority of the respective signals, the WD may receive the signal with a higher priority than the priority of another signal or the signal with the highest priority properly in a reliable and easy manner.

According to one aspect of the disclosure, a wireless device is provided. The wireless device is provided with different beam indications for reception of at least a first signal and a second signal. The wireless device includes processing circuitry configured to receive the first signal of a first signal type on a beam indicated by one of the beam indications. The first signal type has a higher priority than a second signal type of the second signal.

According to one or more embodiments of this aspect, each beam indication indicates a spatial Quasi Colocation, QCL, relation. According to one or more embodiments of this aspect, receiving of the first signal of the first signal type on the beam indicated by one of the beam indications corresponds to receiving only the first signal of the first signal type having the higher priority if the wireless device is provided with the different beam indications at the same time. According to one or more embodiments of this aspect, the different beam indications include two beam indications for reception of a Physical Downlink Control Channel, PDCCH, and Physical Downlink Shared Channel, PDSCH, at the same time, and the receiving of the first signal of the first signal type on the beam indicated by one of the beam indications corresponds to receiving the PDCCH that has a higher priority than the PDSCH. According to one or more embodiments of this aspect, there are only two beam indications.

According to one or more embodiments of this aspect, the processing circuitry is further configured to receive the different beam indications, and the receiving of the beam indications corresponds to the wireless device being provided with different beam indications. According to one or more embodiments of this aspect, the processing circuitry is configured to apply the beam indication for the signal type that has the higher priority. The receiving of the first signal of the first signal type on the beam indicated by one of the beam indications is based at least in part on the applying of the beam indication. According to one or more embodiments of this aspect, the respective priorities of the signal types of the first and second signals are predefined in a wireless communication standard. According to one or more embodiments of this aspect, the respective priorities of the signal types of the first and second signals are received. According to one or more embodiments of this aspect, the higher priority of the first signal type is the highest priority.

According to one or more embodiments of this aspect, the first signal is a downlink signal and the second signal is another downlink signal. The different beam indications are for the downlink signals. According to one or more embodiments of this aspect, the different beam indications are conflicting. According to one or more embodiments of this aspect, the different beam indications are conflicting based at least in part on the different tuning parameters associated with the different beam indications for reception of the first signal and the second signal.

According to one or more embodiments of this aspect, the different beam indications are conflicting if receiving of the first signal and second signal, at the same time, results in a communication signal quality below a predefined threshold. According to one or more embodiments of this aspect, receiving the first signal of the first signal type on the beam indicated by one of the beam indications corresponds to monitoring at least one resource associated with the first signal while refraining from monitoring at least one resource associated with the second signal.

According to another aspect of the disclosure, a method performed by a wireless device is provided. The wireless device is provided with different beam indications for reception of at least a first signal and a second signal. The first signal of a first signal type on a beam indicated by one of the beam indications is received. The first signal type has a higher priority than a second signal type of the second signal.

According to one or more embodiments of this aspect, each beam indication indicates a spatial Quasi Colocation, QCL, relation. According to one or more embodiments of this aspect, receiving the first signal of the first signal type on the beam indicated by one of the beam indications corresponds to receiving only the first signal of the first signal type having the higher priority if the wireless device is provided with the different beam indications at the same time. According to one or more embodiments of this aspect, the different beam indications include two beam indications for reception of a Physical Downlink Control Channel, PDCCH, and Physical Downlink Shared Channel, PDSCH, at the same time. The receiving of the first signal of the first signal type on the beam indicated by one of the beam indications corresponds to receiving the PDCCH that has a higher priority than the PDSCH. According to one or more embodiments of this aspect, there are only two beam indications.

According to one or more embodiments of this aspect, the different beam indications are received. The receiving of the beam indications corresponding to the wireless device is provided with different beam indications. According to one or more embodiments of this aspect, the beam indication for the signal type having the higher priority is applied. The receiving of the first signal of the first signal type on the beam indicated by one of the beam indications is based at least in part on the applying of the beam indication.

According to one or more embodiments of this aspect, the respective priorities of the signal types of the first and second signals are predefined in a wireless communication standard. According to one or more embodiments of this aspect, the respective priorities of the signal types of the first and second signals are received. According to one or more embodiments of this aspect, the higher priority of the first signal type is the highest priority. According to one or more embodiments of this aspect, the first signal is a downlink signal and the second signal is another downlink signal where the different beam indications are for the downlink signals.

According to one or more embodiments of this aspect, the different beam indications are conflicting. According to one or more embodiments of this aspect, the different beam indications are conflicting based at least in part on the different tuning parameters associated with the different beam indications for reception of the first signal and the second signal. According to one or more embodiments of this aspect, the different beam indications are conflicting if receiving of the first signal and second signal, at the same time, results in a communication signal quality below a predefined threshold. According to one or more embodiments of this aspect, receiving the first signal of the first signal type on the beam indicated by one of the beam indications corresponds to monitoring at least one resource associated with the first signal while refraining from monitoring at least one resource associated with the second signal.

According to another aspect of the disclosure, a network node is provided. The network node includes processing circuitry configured to provide different beam indications to a wireless device for reception of at least a first signal and a second signal where the first signal is of a first signal type on a beam indicated by one of the beam indications, and where the first signal type has a higher priority than a second signal type of the second signal.

According to one or more embodiments of this aspect, each beam indication indicates a spatial Quasi Colocation, QCL, relation. According to one or more embodiments of this aspect, the different beam indications are provided to the wireless device at the same time and cause the wireless device to receive only the first signal of the first signal type having the higher priority. According to one or more embodiments of this aspect, the different beam indications include two beam indications for reception at the wireless device of a Physical Downlink Control Channel, PDCCH, and Physical Downlink Shared Channel, PDSCH, at the same time, and the PDCCH has a higher priority than the PDSCH. According to one or more embodiments of this aspect, there are only two beam indications.

According to one or more embodiments of this aspect, the respective priorities of the signal types of the first and second signals are predefined in a wireless communication standard. According to one or more embodiments of this aspect, the processing circuitry is configured to signal respective priorities of the signal types of the first and second signals. According to one or more embodiments of this aspect, the higher priority of the first signal type is the highest priority. According to one or more embodiments of this aspect, the first signal is a downlink signal and the second signal is another downlink signal. The different beam indications are for the downlink signals. According to one or more embodiments of this aspect, the different beam indications are conflicting.

According to one or more embodiments of this aspect, the different beam indications are conflicting based at least in part on different tuning parameters associated with the different beam indications for reception of the first signal and the second signal. According to one or more embodiments of this aspect, the different beam indications are conflicting if receiving of the first signal and second signal, at the same time at the wireless device, results in a communication signal quality below a predefined threshold.

According to another aspect of the disclosure, a method performed by a network node is provided. Different beam indications are provided to a wireless device for reception of at least a first signal and a second signal. The first signal is of a first signal type on a beam indicated by one of the beam indications. The first signal type has a higher priority than a second signal type of the second signal.

According to one or more embodiments of this aspect, each beam indication indicates a spatial Quasi Colocation, QCL, relation. According to one or more embodiments of this aspect, the different beam indications are provided to the wireless device at the same time and cause the wireless device to receive only the first signal of the first signal type that has the higher priority. According to one or more embodiments of this aspect, the different beam indications include two beam indications for reception at the wireless device of a Physical Downlink Control Channel, PDCCH, and Physical Downlink Shared Channel, PDSCH, at the same time, and the PDCCH has a higher priority than the PDSCH. According to one or more embodiments of this aspect, there are only two beam indications. According to one or more embodiments of this aspect, the respective priorities of the signal types of the first and second signals are predefined in a wireless communication standard.

According to one or more embodiments of this aspect, the processing circuitry is configured to signal respective priorities of the signal types of the first and second signals. According to one or more embodiments of this aspect, the higher priority of the first signal type is the highest priority. According to one or more embodiments of this aspect, the first signal is a downlink signal and the second signal is another downlink signal. The different beam indications are for the downlink signals. According to one or more embodiments of this aspect, the different beam indications are conflicting. According to one or more embodiments of this aspect, the different beam indications are conflicting based at least in part on different tuning parameters associated with the different beam indications for reception of the first signal and the second signal. According to one or more embodiments of this aspect, the different beam indications are conflicting if receiving of the first signal and second signal, at the same time at the wireless device, results in a communication signal quality below a predefined threshold.

According to one or more embodiments, a system comprising a wireless device and network node, both of which are described above, is provided. According to one or more embodiments, a method for the system is provided. According to one or more embodiments, a computer program, including program code which when executed by a processing circuitry causes the wireless device to perform a method described above. According to one or more embodiments, a computer program, including program code which when executed by a processing circuitry causes the network node to perform a method described above. According to one or more embodiments, a computer readable medium including a computer program of one or more of the above embodiments is provided.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a block diagram of an alternative embodiment of a host computer according to some embodiments of the present disclosure;

FIG. 5 is a block diagram of an alternative embodiment of a network node according to some embodiments of the present disclosure;

FIG. 6 is a block diagram of an alternative embodiment of a wireless device according to some embodiments of the present disclosure;

FIG. 7 is a flowchart illustrating exemplary methods implemented in a communication system including a host computer, a network node and a wireless device for executing a client application at a wireless device according to some embodiments of the present disclosure;

FIG. 8 is a flowchart illustrating exemplary methods implemented in a communication system including a host computer, a network node and a wireless device for receiving user data at a wireless device according to some embodiments of the present disclosure;

FIG. 9 is a flowchart illustrating exemplary methods implemented in a communication system including a host computer, a network node and a wireless device for receiving user data from the wireless device at a host computer according to some embodiments of the present disclosure;

FIG. 10 is a flowchart illustrating exemplary methods implemented in a communication system including a host computer, a network node and a wireless device for receiving user data at a host computer according to some embodiments of the present disclosure;

DETAILED DESCRIPTION

Figure 1:
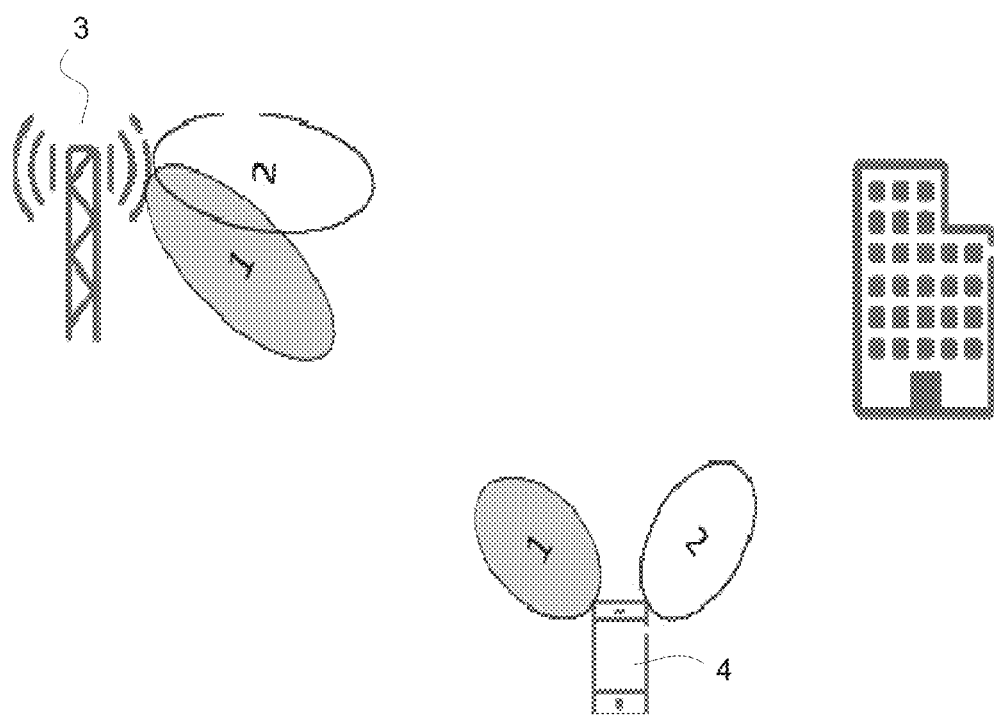
FIG. 1 illustrates multiple beam transmission and reception in a wireless communication system.

Before describing in detail exemplary embodiments, it is noted that the embodiments reside primarily in combinations of apparatus components and processing steps related to beam selection priority in a wireless communication system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (WD) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP Long Term Evolution (LTE), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As explained above, conventionally, the base station, e.g., network node, may transmit two or more signals to the WD at the same time. These two signals may come from different directions, and the base station may provide different beam indications to the WD for the reception of the two or more signals. The WD may be unable to follow both beam indications, due to limitations in its hardware. This would result in one or all of the signals not being received with sufficient quality.

Embodiments described herein overcome these deficiencies by establishing a priority of signal types to be transmitted on a beam. Embodiments provide for applying a selected signal type for transmission on one of a plurality of beams indicated to a wireless device (WD) by a network node (NN). In one embodiment, if the WD is provided with different beam indications at the same time, the WD will apply the beam indication for the channel/signal with the highest priority. In one or more embodiments, each beam indication is associated with a respective signal and/or channel and each signal and/or channel is associated with a respective priority where an example of a priority list is shown in Table 1.

TABLE 1

| Channel/signal | Priority (1 is highest) |
| --- | --- |
| PDCCH | 1 |
| PDSCH | 2 |
| CSI-RS | 3 |

The priority may be predefined in a wireless communications standard and/or may be signaled to the WD. In another embodiment, if the WD is provided with beam indications for simultaneous receptions of the PDSCH (e.g., a first signal and/or channel) and the CSI-RS (e.g., a second signal), the WD applies the beam indication for the PDSCH such as to receive PDSCH indicated by the applied beam indication. In this example, the WD may receive only the PDSCH (e.g., a first signal and/or channel) having a higher priority (e.g., 2) than the CSI-RS (e.g., a second signal and/or channel). In one or more embodiments, receiving the first signal (e.g., signal in PDCCH) of the first signal type (PDCCH) on the beam indicated by one of the beam indications may optionally correspond to monitoring at least one resource associated with the first signal while refraining from monitoring at least one resource associated with the second signal (e.g., signal in PDSCH). In one or more examples, the signals and/or channels are downlink signals and/or downlink channels.

In one or more embodiments, the different beam indication may optionally be conflicting. For example, the different beam indications may be conflicting based at least in part on the different tuning parameters associated with the different beam indications for reception of the first signal (e.g., signal in PDCCH) and the second signal (e.g., signal in PDSCH) such that the WD may essentially have to tune to either the PDCCH or the PDSCH, for example, as the WD may not be able to tune to both to receive simultaneous reception. In another example, the different beam indications are conflicting if receiving of the first signal (e.g., signal in PDCCH) and second signal (e.g., CSI-RS), at the same time, results in a communication signal quality below a predefined threshold.

There are also signals the WD will receive or transmit without any beam indication, e.g., the synchronization sequence block (SSB). In this case, the WD would autonomously determine its beam for reception or transmission. Such channel/signal may be included in the priority list, and assigned a priority. An example of such a list is shown in Table 2:

TABLE 2

| Channel/signal | Priority (1 is highest) |
| --- | --- |
| PDCCH | 1 |
| SSB | 2 |
| PDSCH | 3 |
| CSI-RS | 4 |

If the WD tries to receive the PDSCH and perform measurements on the SSB at the same time, and the WD would like to apply another beam to receive SSB as compared to the beam it would use to receive the PDSCH, the WD is allowed to choose the beam it chose autonomously to measure on SSB to also receive the PDSCH, according to the order in a priority table, such as table 2. In another embodiment, the beam indications are provided as QCL indications. Note that tables 1 and 2 are merely examples and implementations are not limited to the arrangements shown in tables 1 and 2. Other implementations are contemplated such that other priority tables may be established and used.

Figure 2:
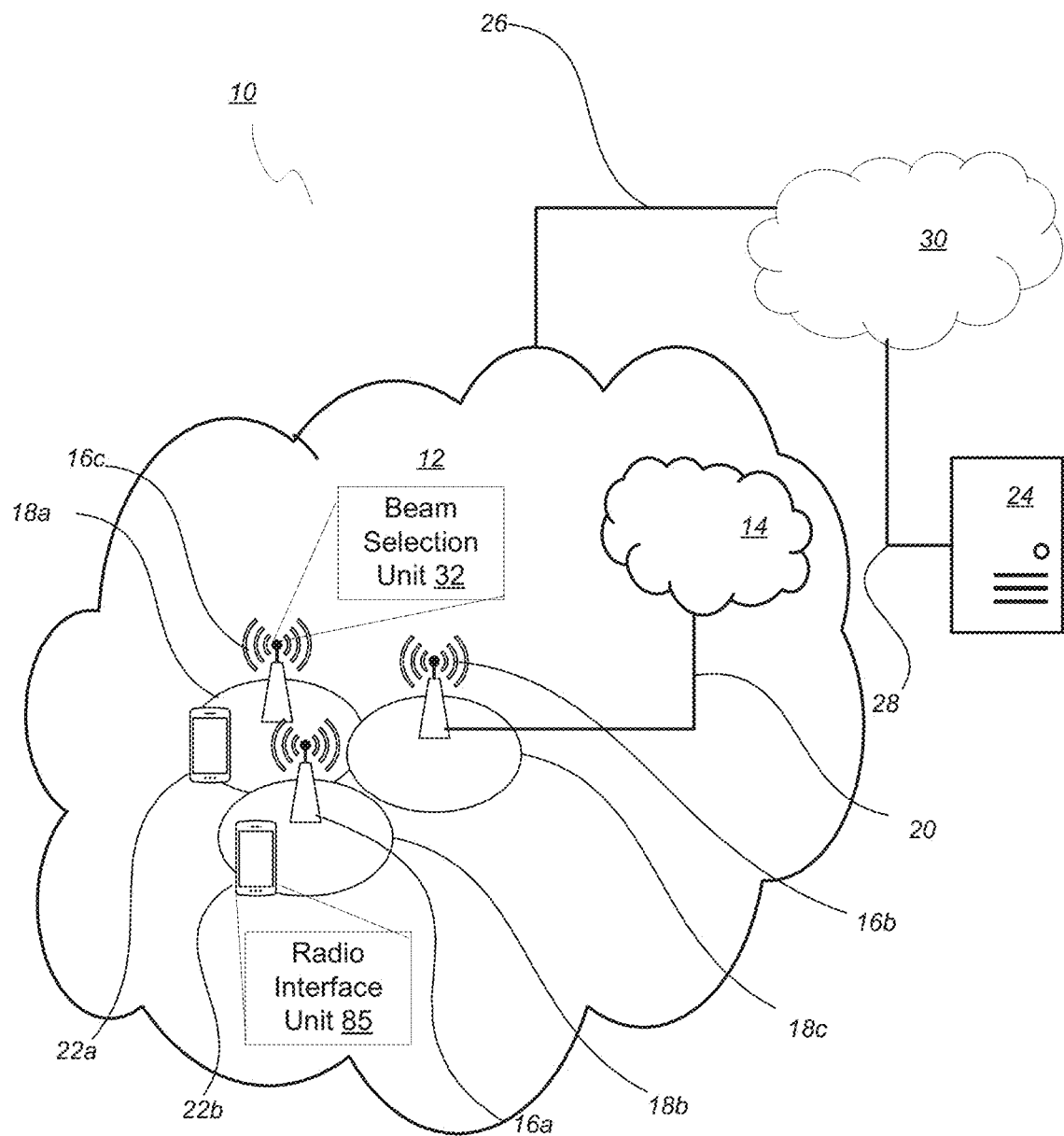
FIG. 2 is a schematic diagram of an exemplary network architecture illustrating a communication system connected via an intermediate network to a host computer according to the principles in the present disclosure.

Returning to the drawing figures, in which like elements are referred to by like reference designators, there is shown in FIG. 2 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD 22 is in the coverage area or where a sole WD 22 is connecting to the corresponding network node 16. Note that although only two WDs 22 and three network nodes 16 are shown for convenience, the communication system may include many more WDs 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a beam selection unit 32 which is configured to select a first transmit beam of a plurality of transmit beams on which to transmit a signal of a signal type having a highest priority of reception. A wireless device 22 is configured to include a radio interface 82 which is configured to receive a signal of a signal type on a beam, the signal type having a highest priority in the ordered list of signal types stored at the WD.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include the beam selection unit 32 configured to select a first transmit beam of a plurality of transmit beams on which to transmit a signal of a signal type having a highest priority of reception.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. The radio interface 82 of the WD 22 may be configured to receive a signal of a signal type a beam, the signal type having a highest priority in the ordered list of signal types stored at the WD. For example, processing circuitry 84 may include the radio interface unit 85 configured to receive the first signal of a first signal type on a beam indicated by one of the beam indications, the first signal type having a higher priority than a second signal type of the second signal, for example.

Figure 3:
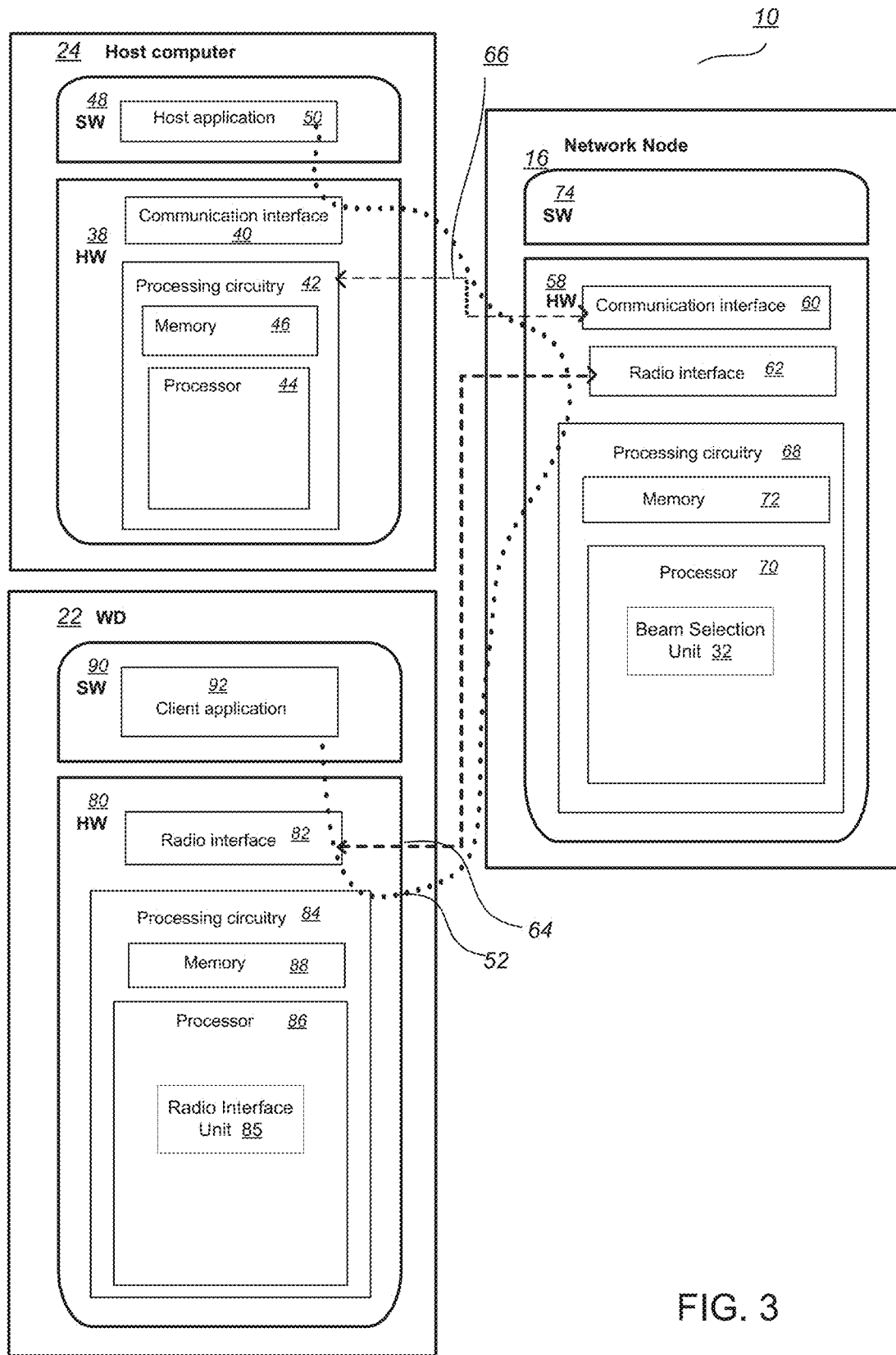
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Although FIGS. 2 and 3 show various "units," such as the beam selection unit 32, as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a block diagram of an alternative host computer 24, which may be implemented at least in part by software modules containing software executable by a processor to perform the functions described herein. The host computer 24 includes a communication interface module 41 configured to set up and maintain a wired or wireless connection with an interface of a different communication device of the communication system 10. The memory module 47 is configured to store data, programmatic software code and/or other information described herein.

FIG. 5 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The beam selection module 33 is configured to select a first transmit beam of a plurality of transmit beams on which to transmit a signal of a signal type having a highest priority of reception.

FIG. 6 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The radio interface module 83 is configured to receive a signal of a signal type on a beam, the signal type having a highest priority in the ordered list of signal types stored at the WD.

FIG. 7 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 50 executed by the host computer 24 (block S108).

FIG. 8 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 9 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD 22 provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 10 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (block S128) in an optional second step, the network node 16 initiates transmission of the received user data to the host computer 24 (block S130). In a third step, the host computer 24 receives the user data carried in the transmission initiated by the network node 16 (block S132).

Figure 11:
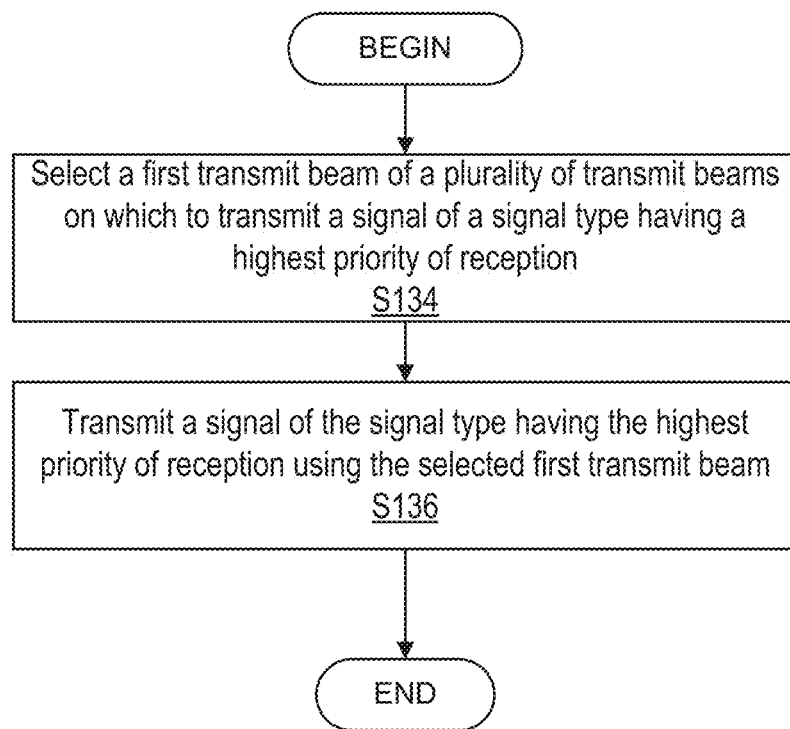
FIG. 11 is a flowchart of an exemplary process in a network node according to some embodiments of the present disclosure.

FIG. 11 is a flowchart of an exemplary process in a network node 16 according to some embodiments of the disclosure. One or more blocks and/or functions performed by network node 16 may be performed by one or more elements of network node 16 such as by beam selection unit 32 in processing circuitry 68, processor 70, radio interface 62, etc. The process includes selecting, via the beam selection module 33, a first transmit beam of a plurality of transmit beams on which to transmit a signal type having a highest priority of reception (block S134). The process also includes transmitting, via a radio interface 62, a signal of the signal type having the highest priority of reception using the selected first transmit beam (block S136). In some embodiments, the network nodes are further configured to indicate to the WD the signal type having the highest priority and to indicate to the WD the selected first transmit beam using which the signal of the signal type having the highest priority is transmitted. Such indication of the selected first beam may be provided as a quasi-colocation indication. In some embodiments, the network node is further configured to select a second transmit beam on which to transmit a signal of a signal type having a second highest priority of reception. In some embodiments, the network node generates a plurality of signal types including the signal type having the highest priority of reception and wherein the network node is further configured to establish an order of priority for each of the plurality of signal types.

Figure 12:
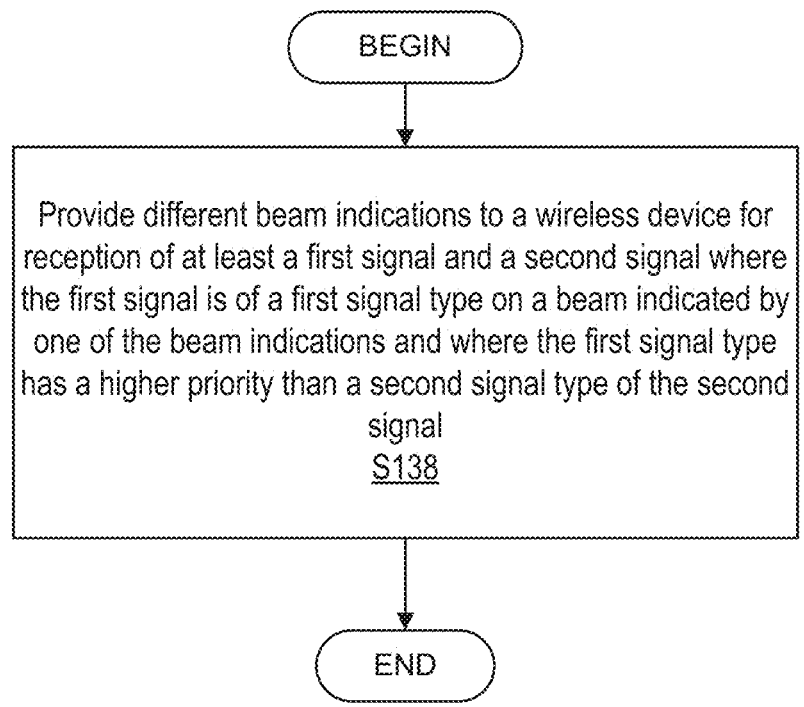
FIG. 12 is a flowchart of another exemplary process in a network node according to some embodiments of the present disclosure.

FIG. 12 is a flowchart of another exemplary process in a network node in accordance with the principles of the disclosure. One or more blocks and/or functions performed by network node 16 may be performed by one or more elements of network node 16 such as by beam selection unit 32 in processing circuitry 68, processor 70, radio interface 62, etc. In one or more embodiments, network node 16 such as via one or more of processing circuitry 68, processor 70 and radio interface 62 is configured to provide (block S138) provide different beam indications to a wireless device 22 for reception of at least a first signal and a second signal where the first signal being of a first signal type on a beam indicated by one of the beam indications, and where the first signal type having a higher priority than a second signal type of the second signal.

According to one or more embodiments, each beam indication indicates a spatial Quasi Colocation, QCL, relation. According to one or more embodiments, the different beam indications are provided to the wireless device 22 at the same time and cause the wireless device 22 to receive only the first signal of the first signal type having the higher priority. According to one or more embodiments, the different beam indications include two beam indications for reception at the wireless device of a Physical Downlink Control Channel, PDCCH, and Physical Downlink Shared Channel, PDSCH, at the same time, and the PDCCH having a higher priority than the PDSCH.

According to one or more embodiments, the respective priorities of the signal types of the first and second signals are predefined in a wireless communication standard. According to one or more embodiments, the processing circuitry 68 is configured to signal respective priorities of the signal types of the first and second signals. According to one or more embodiments, the first signal is a downlink signal and the second signal is another downlink signal, the different beam indications being for the downlink signals. According to one or more embodiments, the different beam indications are conflicting. According to one or more embodiments, the different beam indications are conflicting based at least in part on different tuning parameters associated with the different beam indications for reception of the first signal and the second signal. According to one or more embodiments, the different beam indications are conflicting if receiving of the first signal and second signal, at the same time at the wireless device, results in a communication signal quality below a predefined threshold.

Figure 13:
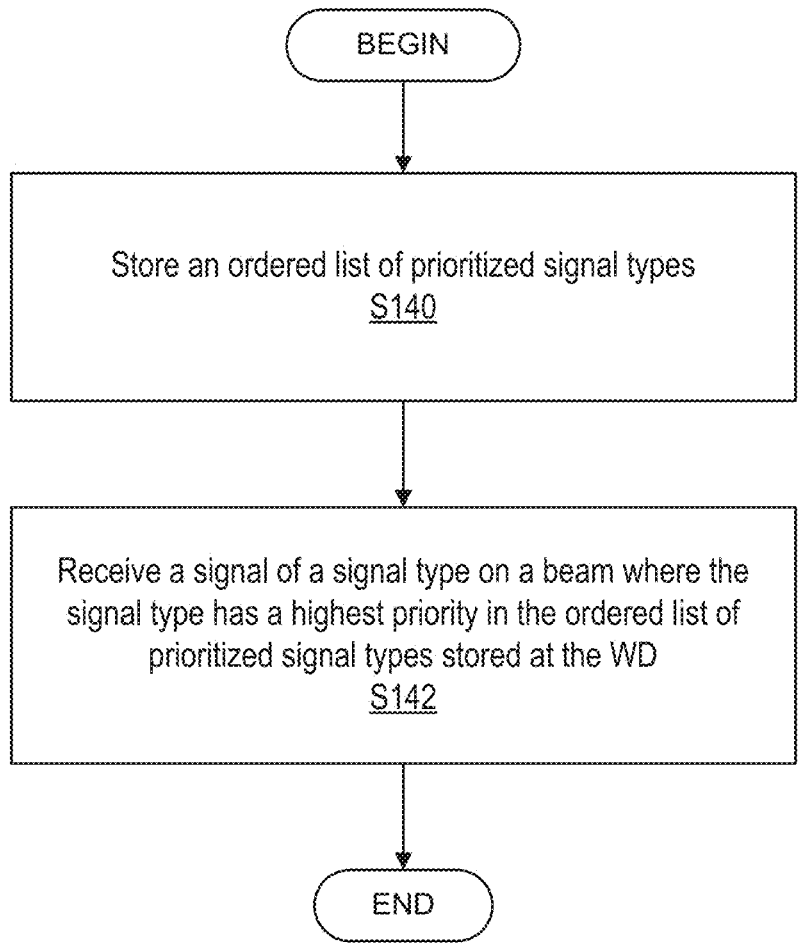
FIG. 13 is a flowchart of an exemplary process in a wireless device according to some embodiments of the present disclosure.

FIG. 13 is a flowchart of an exemplary process in a wireless device 22 according to some embodiments of the disclosure. One or more blocks and/or functions performed by wireless device 22 may be performed by one or more elements of wireless device 22 such as by radio interface unit 85, processing circuitry 84, processor 86, radio interface 82, etc. The process includes storing an ordered list of prioritized signal types (block S140). The process further includes receiving, via the radio interface 82, a signal of a signal type on abeam, the signal type having a highest priority in the ordered list of signal types stored at the WD 22 (block S142). Optionally, the WD 22 may be further configured to receive from a network node a beam indication indicating the beam by which the WD 22 receives the signal. In some embodiments, if the WD 22 receives an indication of more than one beam at a time, the WD 22 is configured to apply the signal having the highest priority to a first one of the more than one beam. In some embodiments, the signal having the highest priority is a physical downlink shared channel, PDSCH. In some embodiments, if the WD 22 receives beam indications for simultaneous receptions of a physical downlink shared channel, PDSCH, and channel state information reference signals, CSI-RS, the WD applies a beam indication for the PDSCH. In some embodiments, the ordered list of signal types includes an SSB.

Figure 14:
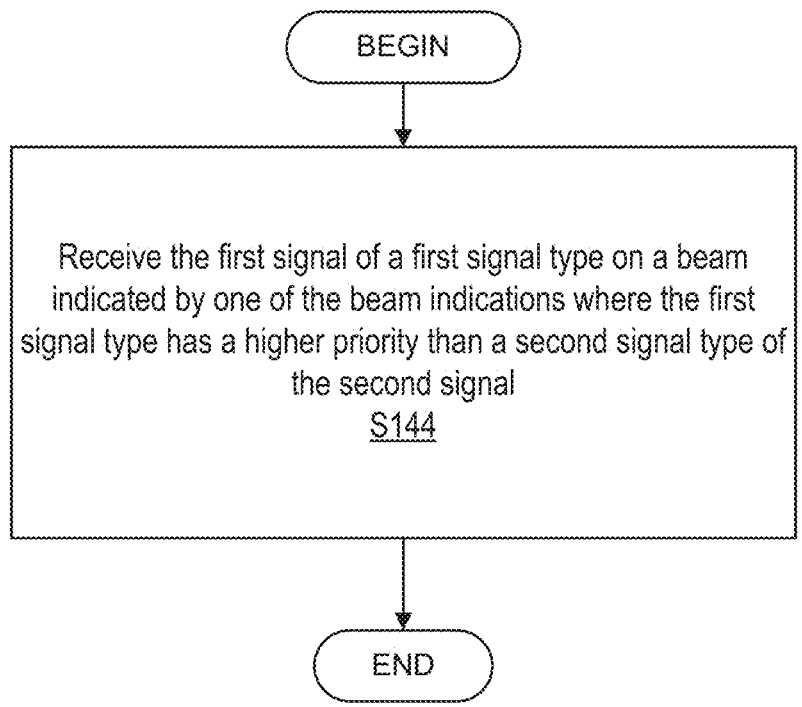
FIG. 14 is a flowchart of another exemplary process in a wireless device according to some embodiments of the present disclosure.

FIG. 14 is a flowchart of another exemplary process in a wireless device 22 in accordance with the principles of the disclosure. One or more blocks and/or functions performed by wireless device 22 may be performed by one or more elements of wireless device 22 such as by radio interface unit 85, processing circuitry 84, processor 86, radio interface 82, etc. In one or more embodiments, wireless device 22 such as via one or more of processing circuitry 84, processor 86 and radio interface 82 is configured to receive (block S144) the first signal of a first signal type on a beam indicated by one of the beam indications where the first signal type having a higher priority than a second signal type of the second signal.

According to one or more embodiments, each beam indication indicates a spatial Quasi Colocation, QCL, relation. According to one or more embodiments, receiving the first signal of the first signal type on the beam indicated by one of the beans indications corresponds to receiving only the first signal of the first signal type having the higher priority if the wireless device is provided with the different beam indications at the same time. According to one or more embodiments, the different beam indications include two beam indications for reception of a Physical Downlink Control Channel, PDCCH, and Physical Downlink Shared Channel, PDSCH, at the same time, and the receiving of the first signal of the first signal type on the beam indicated by one of the beam indications corresponds to receiving the PDCCH that has a higher priority than the PDSCH.

According to one or more embodiments, the processing circuitry 68 is further configured to receive the different beam indications where the receiving of the beam indications corresponding to the wireless device 22 is provided with different beam indications. According to one or more embodiments, processing circuitry 68 is configured to apply the beam indication for the signal type having the highest priority where the receiving of the first signal of the first signal type on the beam indicated by one of the beam indications is based at least in part on the applying of the beam indication. According to one or more embodiments, the respective priorities of the signal types of the first and second signals are predefined in a wireless communication standard.

According to one or more embodiments, the respective priorities of the signal types of the first and second signals are received. According to one or more embodiments, the first signal is a downlink signal and the second signal is another downlink signal where the different beam indications being for the downlink signals. According to one or more embodiments, the different beam indications are conflicting. According to one or more embodiments, the different beam indications are conflicting based at least in part on the different tuning parameters associated with the different beam indications for reception of the first signal and the second signal. According to one or more embodiments, the different beam indications are conflicting if receiving of the first signal and second signal, at the same time, results in a communication signal quality below a predefined threshold. According to one or more embodiments, receiving the first signal of the first signal type on the beam indicated by one of the beam indications corresponds to monitoring at least one resource associated with the first signal while refraining from monitoring at least one resource associated with the second signal.

Figure 15:
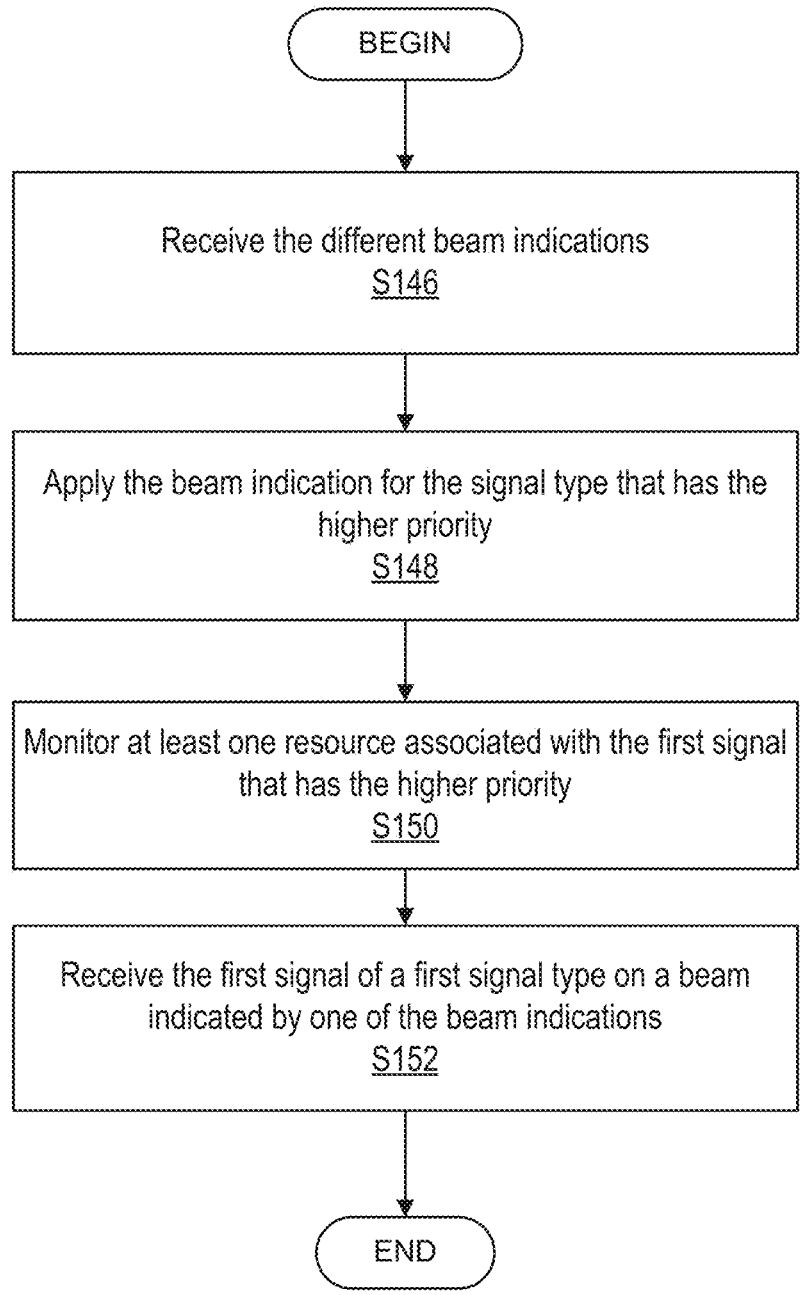
FIG. 15 is a flowchart of yet another exemplary process in a wireless device according to some embodiments of the present disclosure.

FIG. 15 is a flowchart of yet another exemplary process in a wireless device 22 in accordance with the principles of the disclosure. One or more blocks and/or functions performed by wireless device 22 may be performed by one or more elements of wireless device 22 such as by radio interface unit 85, processing circuitry 84, processor 86, radio interface 82, etc. In one or more embodiments, wireless device 22 such as via one or more of processing circuitry 84, processor 86 and radio interface 82 receives (block S146) the different beam indications, as described herein. For example, in one or more embodiments, wireless device 22 such as via one or more of processing circuitry 84, processor 86 and radio interface 82 receives the different beam indications where the receiving of the beam indications corresponds to the wireless device 22 being provided with different beam indications, as described herein.

In one or more embodiments, wireless device 22 such as via one or more of processing circuitry 84, processor 86 and radio interface 82 applies (block S148) the beam indication for the signal type that has the higher priority, as described herein. For example, in one or more embodiments, wireless device 22 such as via one or more of processing circuitry 84, processor 86 and radio interface 82 applies the beam indication for the signal type having the higher priority where the receiving of the first signal of the first signal type on the beam indicated by one of the beam indications is based at least in part on the applying of the beam indication, as described herein. In one or more embodiments, wireless device 22 such as via one or more of processing circuitry 84, processor 86 and radio interface 82 monitors (block S150) at least one resource associated with the first signal that has the higher priority, as described herein. For example, in one or more embodiments, wireless device 22 such as via one or more of processing circuitry 84, processor 86 and radio interface 82 monitors at least one resource associated with the first signal while refraining from monitoring at least one resource associated with the second signal, as described herein.

In one or more embodiments, wireless device 22 such as via one or more of processing circuitry 84, processor 86 and radio interface 82 receives (block S152) the first signal of a first signal type on a beam indicated by one of the beam indications, as described herein. For example, in one or more embodiments, wireless device 22 such as via one or more of processing circuitry 84, processor 86 and radio interface 82 receives the first signal of a first signal type on a beam indicated by one of the beam indications where the first signal type has a higher priority than a second signal type of the second signal, as described herein.

Figure 16:
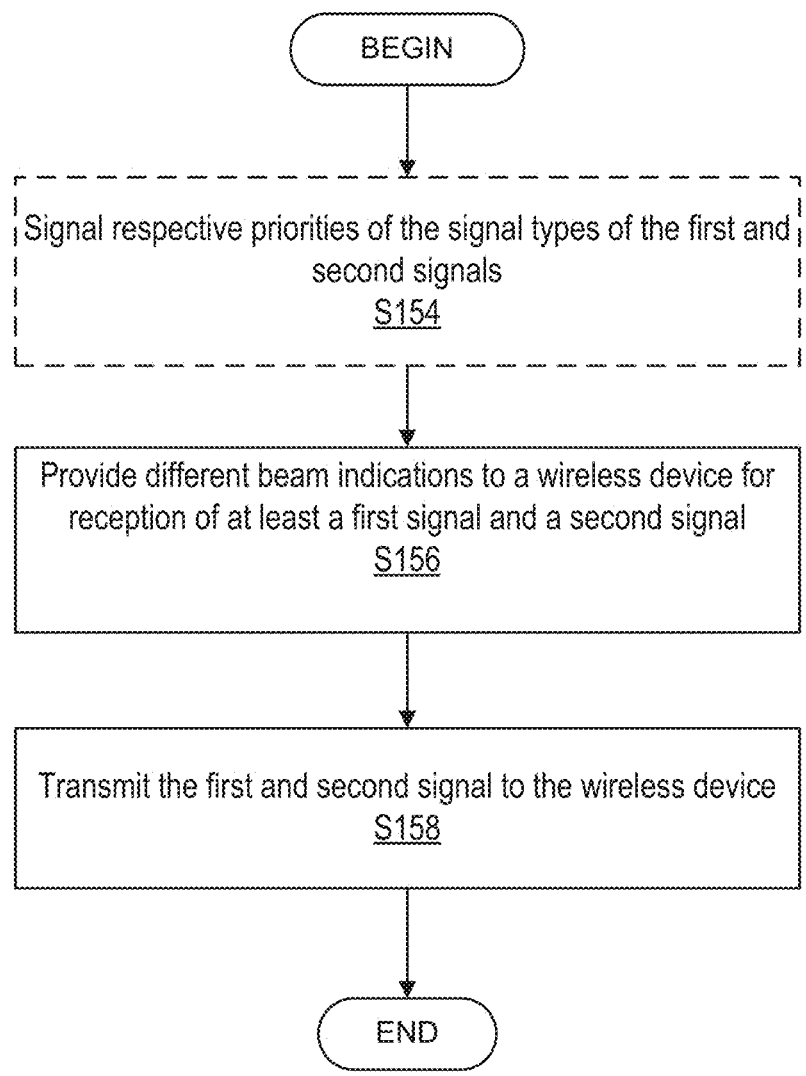
FIG. 16 is a flowchart of yet another exemplary process in a network node according to some embodiments of the present disclosure.

FIG. 16 is a flowchart of yet another exemplary process in a network node 16 in accordance with the principles of the disclosure. One or more blocks and/or functions performed by network node 16 may be performed by one or more elements of network node 16 such as by beam selection unit 32 in processing circuitry 68, processor 70, radio interface 62, etc. In one or more embodiments, network node 16 such as via one or more of processing circuitry 68, processor 70 and radio interface 62, optionally, signals (block S154) respective priorities of the signal types of the first and second signals, as described herein.

In one or more embodiments, network node 16 such as via one or more of processing circuitry 68, processor 70 and radio interface 62 provides (block S156) different beam indications to a wireless device for reception of at least a first signal and a second signal, as described herein. For example, in one or more embodiments, network node 16 such as via one or more of processing circuitry 68, processor 70 and radio interface 62 provides different beam indications to a wireless device (22) for reception of at least a first signal and a second signal, where the first signal is of a first signal type on a beam indicated by one of the beam indications, and the first signal type has a higher priority than a second signal type of the second signal, as described herein. In one or more embodiments, network node 16 such as via one or more of processing circuitry 68, processor 70 and radio interface 62 transmits (block S158) the first and second signal to the wireless device, as described herein.

EXAMPLES

Example A1. A network node 16 configured to communicate with a wireless device 22 (WD 22), the network node 16 configured to, and/or comprising a radio interface 62 and/or comprising processing circuitry 68 configured to:
select a first transmit beam of a plurality of transmit beams on which to transmit a signal of a signal type having a highest priority of reception; and
transmit a signal of the signal type having the highest priority of reception using the selected first transmit beam.

Example A2. The network node 16 of Example A1, wherein the network node 16 is further configured to indicate to the WD 22 the signal type having the highest priority and to indicate to the WD 22 the selected first transmit beam using which the signal of the signal type having the highest priority is transmitted.

Example A3. The network node of Example A2, wherein the indication of the selected first transmit beam is provided as a quasi-colocation, QCL, indication.

Example A4. The network node 16 of Example A1, wherein the network node 16 is further configured to select a second transmit beam on which to transmit a signal of a signal type having a second highest priority of reception.

Example A5. The network node 16 of Example A1, wherein the network node 16 generates a plurality of signal types including the signal type having the highest priority of reception and wherein the network node 16 is further configured to establish an order of priority for each of the plurality of signal types.

Example A6. The network node 16 of Example A5, wherein an order of priority of signal types is a physical downlink control channel, PDCCH, having highest priority, a physical downlink shared channel, PDSCH, having a next highest priority, and a channel state information reference signal, CSI-RS, having priority less than the priority of the PDSCH.

Example B1. A communication system 10 including a host computer 24, the host computer 24 comprising:
processing circuitry 42 configured to provide user data; and
a communication interface 40 configured to forward the user data to a cellular network for transmission to a wireless device 22 (WD 22),
the cellular network comprising a network node 16 having a radio interface 62 and processing circuitry 68, the network node 16 configured to:
select a first transmit beam of a plurality of transmit beams on which to transmit a signal of a signal type having a highest priority of reception; and
transmit a signal of the signal type having the highest priority of reception using the selected first transmit beam.

Example B2. The communication system 10 of Example B1, further including the network node 16.

Example B3. The communication system 10 of Example B2, further including the WD 22, wherein the WD 22 is configured to communicate with the network node 16.

Example B4. The communication system 10 of Example B3, wherein:
- the processing circuitry 68 of the host computer 24 is configured to execute a host application 50, thereby providing the user data; and
- the WD 22 comprises processing circuitry configured to execute a client application 92 associated with the host application 50.

Example C1. A method implemented in a network node 16, the method comprising
selecting a first transmit beam of a plurality of transmit beams on which to transmit a signal type having a highest priority of reception; and
transmitting a signal of the signal type having the highest priority of reception using the selected first transmit beam.

Example C2. The method of Example C1, further comprising indicating to the WD 22 the signal type having the highest priority and indicating to the WD 22 the selected first transmit beam using which the signal of the signal type having the highest priority is transmitted.

Example C3. The method of Example C2, wherein the indication of the selected first transmit beam is provided as a quasi-colocation, QCL, indication.

Example C4. The method of Example C1, further comprising selecting a second transmit beam on which to transmit a signal of a signal type having a second highest priority of reception.

Example C5. The method of Example C1, further comprising establishing an order of priority for each of a plurality of signal types including the signal type having the highest priority of reception.

Example C6. The method of Example C5, wherein an order of priority of signal types is a physical downlink control channel, PDCCH, having highest priority, a physical downlink shared channel, PDSCH, having a next highest priority, and a channel state information reference signal, CSI-RS, having priority less than the priority of the PDSCH.

Example D1. A method implemented in a communication system 10 including a host computer 24, a network node 16 and a wireless device 22 (WD 22), the method comprising:
- at the host computer 24, providing user data; and
- at the host computer 24, initiating a transmission carrying the user data to the WD 22 via a cellular network comprising the network node 16, wherein the network node 16 is configured to:
- select a first transmit beam of a plurality of transmit beams on which to transmit a signal of a signal type having a highest priority of reception; and
- transmit a signal of the signal type having the highest priority of reception using the selected first transmit beam.

Example D2. The method of Example D1, further comprising, at the network node 16, transmitting the user data.

Example D3. The method of Example D2, wherein the user data is provided at the host computer 24 by executing a host application 50, the method further comprising, at the WD 22, executing a client application 92 associated with the host application 50.

Example E1. A wireless device 22 (WD 22) configured to communicate with a network node 16, the WD 22 configured to, and/or comprising a radio interface 82 and/or processing circuitry 84 configured to:
store an ordered list of prioritized signal types; and
receive a signal of a signal type on a beam, the signal type having a highest priority in the ordered list of prioritized signal types stored at the WD 22.

Example E2. The WD 22 of Example E1, wherein the WD 22 is further configured to receive from a network node 16 a beam indication indicating the beam by which the WD 22 receives the signal.

Example E3. The WD 22 of Example E2, wherein, if the WD 22 receives an indication of more than one beam at a time, the WD 22 is configured to apply the signal having the highest priority to a first one of the more than one beam.

Example E4. The WD 22 of Example E1, wherein the signal having the highest priority is a physical downlink shared channel, PDSCH.

Example E5. The WD 22 of Example E1, wherein if the WD 22 receives beam indications for simultaneous receptions of a physical downlink shared channel, PDSCH, and channel state information reference signals, CSI-RS, the WD 22 applies a beam indication for the PDSCH.

Example E6. The WD 22 of Example E1, wherein the ordered list of signal types includes a synchronization sequence block, SSB.

Example F1. A communication system 10 including a host computer 24, the host computer 24 comprising:
processing circuitry 42 configured to provide user data; and
- a communication interface 40 configured to forward user data to a cellular network for transmission to a wireless device 22 (WD 22),
- the WD 22 configured to, and/or comprising a radio interface 82 and/or processing circuitry 84 configured to:
store an ordered list of prioritized signal types; and
receive a signal of a signal type on the indicated beam, the signal type having a highest priority in the ordered list of signal types stored at the WD 22.

Example F2. The communication system of Example F1, further including the WD 22.

Example F3. The communication system of Example F2, wherein the cellular network further includes a network node configured to communicate with the WD 22.

Example F4. The communication system of Example F2 or F3, wherein:
- the processing circuitry 42 of the host computer 24 is configured to execute a host application 50, thereby providing the user data; and
- the WD's processing circuitry 84 is configured to execute a client application 92 associated with the host application 50.

Example G1. A method implemented in a wireless device 22 (WD 22), the method comprising
storing an ordered list of prioritized signal types; and
receiving a signal of a signal type on the indicated beam, the signal type having a highest priority in the ordered list of signal types stored at the WD 22.

Example G2. The method of Example G1, further comprising receiving from a network node 16 a beam indication indicating the beam by which the WD 22 receives the signal.

Example G3. The method of Example G2, wherein, if the WD 22 receives an indication of more than one beam at a time, the WD 22 will apply the signal having the highest priority to a first one of the more than one beam.

Example G4. The method of Example G1, wherein the signal having the highest priority is a physical downlink shared Channel, PDSCH.

Example G5. The method of Example G1, wherein if the WD 22 receives beam indications for simultaneous receptions of a physical downlink shared channel, PDSCH, and channel state information reference signals, CSI-RS, the WD 22 applies a beam indication for the PDSCH.

Example G6. The method of Example G1, wherein the ordered list of signal types includes a synchronization sequence block, SSB.

Example H1. A method implemented in a communication system 10 including a host computer 24, a network node 16 and a wireless device 22 (WD 22), the method comprising:
- at the host computer 24, providing user data; and
- at the host computer 24, initiating a transmission carrying the user data to the WD 22 via a cellular network comprising the network node 16, wherein the WD 22 store an ordered list of prioritized signal types; and
- receive a signal of a signal type on the indicated beam, the signal type having a highest priority in the ordered list of signal types stored at the WD 22.

Example H2. The method of Example 35, further comprising, at the WD 22, receiving the user data from the network node 16.

Example I1. A network node 16, comprising:
- a memory module 73 configured to store a plurality of beam indications; and
- a beam selection module 33 configured to select a first transmit beam of a plurality of transmit beams by which to transmit a signal of a signal type having a highest priority of reception.

Example I2. A wireless device 22, comprising:
- a memory module 89 configured to store an ordered list of prioritized signal types
- a radio interface module 83 configured to receive a signal of a signal type on a beam, the signal type having a highest priority in the ordered list of signal types stored at the WD 22.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending on the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the users computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A wireless device, the wireless device being provided with different beam indications for reception of at least a first signal and a second signal, the wireless device comprising:
processing circuitry configured to receive, from the network node, the first signal of a first signal type on a beam indicated by one of the beam indications, the first signal type having a higher priority than a second signal type of the second signal, receiving, from the network node, the first signal of the first signal type on the beam indicated by one of the beam indications corresponds to receiving only the first signal of the first signal type having the higher priority if the wireless device is provided with the different beam indications at the same time, and receiving the first signal of the first signal type on the beam indicated by one of the beam indications corresponds to monitoring at least one resource associated with the first signal while refraining from monitoring at least one resource associated with the second signal.

2. A method performed by a wireless device, the wireless device being provided with different beam indications for reception, from a network node, of at least a first signal and a second signal, the method comprising:
receiving, from the network node, the first signal of a first signal type on a beam indicated by one of the beam indications, the first signal type having a higher priority than a second signal type of the second signal, receiving, from the network node, the first signal of the first signal type on the beam indicated by one of the beam indications corresponds to receiving only the first signal of the first signal type having the higher priority if the wireless device is provided with the different beam indications at the same time, and receiving the first signal of the first signal type on the beam indicated by one of the beam indications corresponds to monitoring at least one resource associated with the first signal while refraining from monitoring at least one resource associated with the second signal.

3. The method of claim 2, wherein each beam indication indicates a spatial Quasi Colocation, QCL, relation.

4. The method of claim 2, wherein the different beam indications include two beam indications for reception, from the network node, of a Physical Downlink Control Channel, PDCCH, and Physical Downlink Shared Channel, PDSCH, at the same time; and
the receiving, from the network node, of the first signal of the first signal type on the beam indicated by one of the beam indications corresponds to receiving, from the network node, the PDCCH that has a higher priority than the PDSCH.

5. The method of claim 4, wherein there are only two beam indications.

6. The method of claim 2, wherein the method further comprises receiving, from the network node, the different beam indications, the receiving of the beam indications corresponding to the wireless device being provided with different beam indications.

7. The method of claim 2, wherein the method further comprises applying the beam indication for the signal type having the higher priority, the receiving, from the network node, of the first signal of the first signal type on the beam indicated by one of the beam indications being based at least in part on the applying of the beam indication.

8. The method of claim 2, wherein the respective priorities of the signal types of the first and second signals are predefined in a wireless communication standard.

9. The method of claim 2, wherein the respective priorities of the signal types of the first and second signals are received.

10. The method of claim 2, wherein the higher priority of the first signal type is a highest priority.

11. The method of claim 2, wherein the first signal is a downlink signal and the second signal is another downlink signal, the different beam indications being for the downlink signals.

12. The method of claim 2, wherein the different beam indications are conflicting.

13. The method of claim 2, wherein the different beam indications are conflicting based at least in part on the different tuning parameters associated with the different beam indications for reception, from the network node, of the first signal and the second signal.

14. The method of claim 2, wherein the different beam indications are conflicting if receiving, from the network node, of the first signal and second signal, at the same time, results in a communication signal quality below a predefined threshold.

15. A network node, comprising:
processing circuitry configured to:
provide different beam indications, from the network node, to a wireless device for reception of at least a first signal and a second signal, the first signal being of a first signal type on a beam indicated by one of the beam indications, the first signal type having a higher priority than a second signal type of the second signal, the different beam indications being provided to the wireless device at the same time, causing the wireless device to receive, from the network node, only the first signal of the first signal type having the higher priority, and causing the wireless device to monitor at least one resource associated with the first signal while refraining from monitoring at least one resource associated with the second signal.

16. A method performed by a network node, the method comprising:
providing different beam indications, from the network node, to a wireless device for reception of at least a first signal and a second signal, the first signal being of a first signal type on a beam indicated by one of the beam indications, the first signal type having a higher priority than a second signal type of the second signal, the different beam indications being provided to the wireless device at the same time, causing the wireless device to receive, from the network node, only the first signal of the first signal type having the higher priority, and causing the wireless device to monitor at least one resource associated with the first signal while refraining from monitoring at least one resource associated with the second signal.

17. The method of claim 16, wherein each beam indication indicates a spatial Quasi Colocation, QCL, relation.

18. The method of claim 16, wherein the different beam indications include two beam indications for reception, from the network node, at the wireless device of a Physical Downlink Control Channel, PDCCH, and Physical Downlink Shared Channel, PDSCH, at the same time; and
the PDCCH having a higher priority than the PDSCH.

19. The method of claim 18, wherein there are only two beam indications.

20. The method of claim 16, wherein the respective priorities of the signal types of the first and second signals are predefined in a wireless communication standard.

21. The method of claim 16, wherein the method further includes signaling respective priorities of the signal types of the first and second signals.

22. The method of claim 16, wherein the higher priority of the first signal type is the highest priority.

23. The method of claim 16, wherein the first signal is a downlink signal and the second signal is another downlink signal, the different beam indications being for the downlink signals.

24. The method of claim 16, wherein the different beam indications are conflicting.

25. The method of claim 16, wherein the different beam indications are conflicting based at least in part on different tuning parameters associated with the different beam indications for reception, from the network node, of the first signal and the second signal.

26. The method of claim 16, wherein the different beam indications are conflicting if receiving, from the network node, of the first signal and second signal, at the same time at the wireless device, results in a communication signal quality below a predefined threshold.

27. A system, comprising:
a wireless device, the wireless device being provided with different beam indications for reception, from the network node, of at least a first signal and a second signal, the wireless device comprising:
wireless device processing circuitry configured to receive, from the network node, the first signal of a first signal type on a beam indicated by one of the beam indications, the first signal type having a higher priority than a second signal type of the second signal, receiving, from the network node, the first signal of the first signal type on the beam indicated by one of the beam indications corresponds to receiving only the first signal of the first signal type having the higher priority if the wireless device is provided with the different beam indications at the same time, and receiving the first signal of the first signal type on the beam indicated by one of the beam indications corresponds to monitoring at least one resource associated with the first signal while refraining from monitoring at least one resource associated with the second signal; and
a network node, the network node including network node processing circuitry configured to:
provide different beam indications to a wireless device for reception, from the network node, of at least a first signal and a second signal, the first signal being of a first signal type on a beam indicated by one of the beam indications, the first signal type having a higher priority than a second signal type of the second signal, the different beam indications being provided to the wireless device at the same time, causing the wireless device to receive, from the network node, only the first signal of the first signal type having the higher priority, and causing the wireless device to monitor at least one resource associated with the first signal while refraining from monitoring at least one resource associated with the second signal.

28. A method in a system comprising a wireless device and a network node, the wireless device being provided with different beam indications for reception, from the network node, of at least a first signal and a second signal, the method comprising:

providing different beam indications to the wireless device for reception, from the network node, of at least a first signal and a second signal, the first signal being of a first signal type on a beam indicated by one of the beam indications, the first signal type having a higher priority than a second signal type of the second signal, the different beam indications being provided to the wireless device at the same time, causing the wireless device to receive, from the network node, only the first signal of the first signal type having the higher priority, and causing the wireless device to monitor at least one resource associated with the first signal while refraining from monitoring at least one resource associated with the second signal; and receiving, from the network node, the first signal of a first signal type on a beam indicated by one of the beam indications, receiving, from the network node, the first signal of the first signal type on the beam indicated by one of the beam indications corresponds to receiving only the first signal of the first signal type having the higher priority if the wireless device is provided with the different beam indications at the same time, and receiving the first signal of the first signal type on the beam indicated by one of the beam indications corresponds to monitoring at least one resource associated with the first signal while refraining from monitoring at least one resource associated with the second signal.

* * * * *

UNITED STATES PATENT AND TRADEMARK OFFICE
CERTIFICATE OF CORRECTION

PATENT NO. : 11,476,917 B2
APPLICATION NO. : 16/329009
DATED : October 18, 2022
INVENTOR(S) : Tidestav et al.

It is certified that error appears in the above-identified patent and that said Letters Patent is hereby corrected as shown below:

In the Specification

In Column 7, Line 60, delete "(AP)," and insert -- (RAP), --, therefor.

In Column 7, Line 61, delete "(RRU)" and insert -- (RRU), --, therefor.

In Column 7, Line 63, delete "mobile" and insert -- mobility --, therefor.

In Column 8, Lines 13-14, delete "communication (M2M)," and insert -- (M2M) communication, --, therefor.

In Column 8, Line 16, delete "equipped" and insert -- equipment --, therefor.

In Column 8, Line 19, delete "(NB-IOT)" and insert -- (NB-IoT) --, therefor.

In Column 8, Line 27, delete "(RRU)" and insert -- (RRU), --, therefor.

In Column 12, Line 6, delete "and or" and insert -- and/or --, therefor.

In Column 16, Line 39, delete "(block S128) in" and insert -- (block S128). In --, therefor.

In Column 17, Line 60, delete "abeam," and insert -- a beam, --, therefor.

In Column 18, Line 26, delete "beans" and insert -- beam --, therefor.

In Column 21, Line 16, delete "comprising" and insert -- comprising: --, therefor.

In Column 22, Line 56, delete "comprising" and insert -- comprising: --, therefor.

Signed and Sealed this
Eleventh Day of April, 2023

Katherine Kelly Vidal
*Director of the United States Patent and Trademark Office*

CERTIFICATE OF CORRECTION (continued)
U.S. Pat. No. 11,476,917 B2

In Column 23, Line 3, delete "Channel," and insert -- channel, --, therefor.

In Column 23, Line 35, delete "types" and insert -- types; --, therefor.

In Column 24, Line 43, delete "users" and insert -- user's --, therefor.